July 21, 1942.   E. W. STEIN   2,290,625
TIRE TREAD
Filed Aug. 1, 1940
Fig. 1.
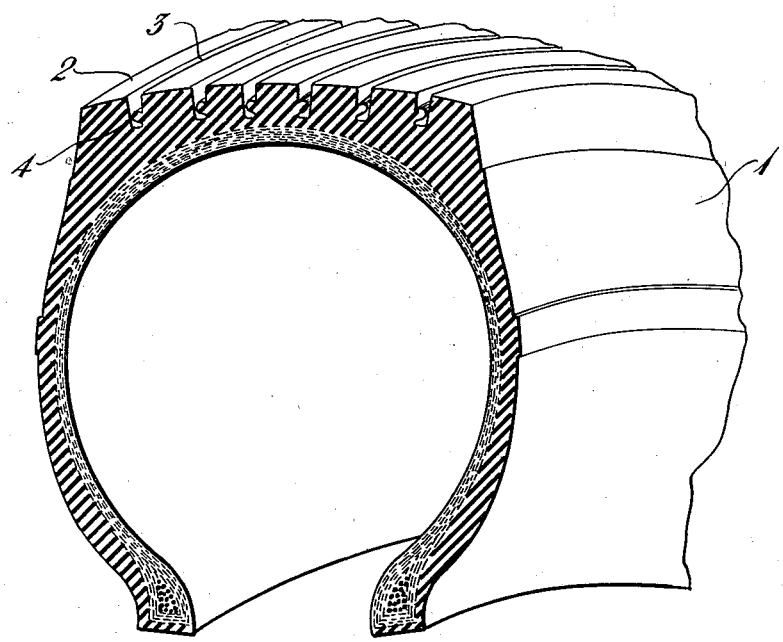
Fig. 2.   Fig. 3.   Fig. 4.
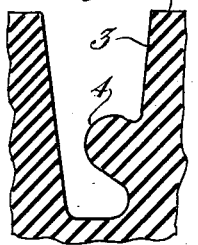   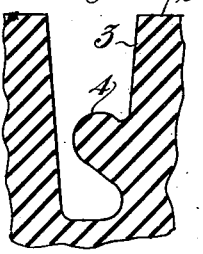   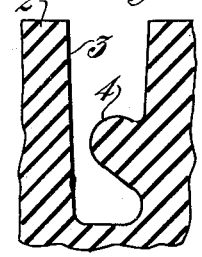
Fig. 5.
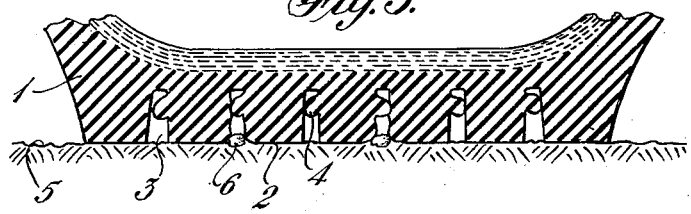
INVENTOR
E. Waldo Stein
BY
ATTORNEYS Patented July 21, 1942

2,290,625

UNITED STATES PATENT OFFICE 2,290,625

TIRE TREAD

Ernest Waldo Stein, Akron, Ohio, assignor to The Firestone Tire & Rubber Company, Akron, Ohio, a corporation of Ohio Application August 1, 1940, Serial No. 349,159

4 Claims. (Cl. 152—209)

This invention relates to improvements in tires, and it relates more particularly to a tire tread provided with improved means for overcoming the tendency of the tread to pick up stones, gravel, or other small objects.

The use of a non-skid tire tread having alternate circumferential ribs and grooves has heretofore been objectionable, because of the great tendency of such a tread to pick up and retain in the grooves small stones or other loose hard objects occurring on the road. A certain amount of the objects picked up are forcibly ejected from the tire as it continues it progress on the road, sometimes making dents in the fenders of the automobile or striking and injuring passing automobiles. Stones which are picked up on a gravel road and retained by the tread give rise to an irritating noise when the tire is later run on a smooth pavement. A more serious result of the retention of hard objects by the tread is the cutting action of some of these objects on the tread at the base of the grooves thereof and the initiation of cracks in this region. In some instances a sharp stone may gradually work completely through the tread and into the plies of a tire, causing an unexpected and sometimes disastrous failure of the tire.

Therefore, a primary object of this invention is to provide a tire having a non-skid tread so constructed that the tire has substantially no tendency to pick up and retain stones or other hard objects.

Another object is to provide a non-skid tire tread with means for substantially eliminating the tendency of the tread to pick up stones or other hard objects and, at the same time, completely eliminating the tendency of picked up objects to become wedged in the bottom of the tread grooves.

Another object is to provide a non-skid tire tread with means for forcibly ejecting from the tread any small hard objects which may be picked up by the tread from the road.

A further object is to provide means for preventing the pick-up and retention of stones or other hard objects by a non-skid tire tread without detracting from the non-skid efficiency or the appearance of the tread.

These and further objects will be apparent from the following detailed description of the invention when considered in connection with the accompanying drawing, in which:

Figure 1 is a perspective view, in section, of a portion of a tire embodying the invention;

Figures 2, 3, and 4 are enlarged transverse views, in section, of portions of the tread shown in Figure 1; and Figure 5 is a transverse sectional view of a portion of a tire embodying the invention, showing the tread in contact with the road.

Typical of previous partially successful attempts to provide means for eliminating stone pick-up and retention by tire treads are the means shown by United States Patents Nos. 2,056,131 and 2,121,871. The former patent suggests the use of small protuberances extending laterally from the sidewalls of the tire tread grooves and being spaced from the periphery of the tread and the bottom of the grooves, the protuberances being nearer the periphery of the tread. Although this construction results in some lowering of the stone pick-up tendency of tire treads, it still allows appreciable pick up and retention of stones. Moreover, this former means for ejecting stones mars the appearance of the tire tread.

Patent No. 2,121,871 shows the use of one or two continuous projections extending laterally from the sidewall or sidewalls of a tread groove and being spaced from the tread periphery and the bottom of the groove. This construction differs mainly from that shown in Patent No. 2,056,131 in that the stone ejecting projections extend continuously with the circumferential groove of the tread instead of consisting of a series of distinct protuberances. The axis of a projection shown in the later patent extends laterally from the sidewall of the groove at a right angle thereto, and, in the preferred construction, the portion of the projection nearer the tread periphery joins the adjacent groove sidewall by means of a concave surface. This construction decreases the tendency of the tread groove to pick up and retain stones, but is somewhat unsatisfactory in actual service in that a few stones are able to work past the projections and become tightly wedged beneath them, causing cracking of the base of the groove. A transverse cross sectional view of the preferred construction shown in Patent No. 2,121,871 appears funnel-shaped. Experience with this construction has brought out the fact that stones picked up and retained in the groove may readily slide past the projections due to the concave upper surfaces thereof. Once a stone is wedged between the projections the resiliency of the latter causes the stone to be pushed into the bottom of the groove, instead of being forcibly ejected.

The present invention overcomes the objections to the former constructions just discussed by providing a continuous projection in the circumferential groove, extending laterally from one sidewall of the groove, the base of the projection being spaced substantially nearer to the bottom of the groove than to the tread periphery, and the projection being tilted towards the tread periphery so that the axis of the projection makes an acute angle with the groove sidewall of which the projection forms a part. Preferably the projection extends substantially more than halfway across the groove and has a convex surface extending radially outwardly from the groove sidewall to which the projection is attached, thus preventing a rounded surface to any stone coming in contact with the projection.

Referring to the drawing, there is shown in Figure 1 a pneumatic tire 1 of conventional construction. The tread of the tire comprises a plurality of ribs 2 (or other traction elements) extending circumferentially around the crown of the tire 1 and defining grooves 3. Suitable stone ejecting means are provided on the sidewalls of the grooves 3. To this end there is provided a laterally projecting member 4 in each groove 3.

Figures 2, 3, and 4, which show the difference in taper of the grooves from the shoulder of the tread to the center thereof, are enlarged transverse sectional views of grooves having the preferred form of the stone ejector. It is clear from these figures that the base of the stone ejecting member 4 is substantially nearer to the bottom of groove 3 than to the periphery of the tread; that the projection is tilted outwardly from the groove sidewall towards the tread periphery so that the axis or center line of the projection makes an acute angle with the groove sidewall of which the projection forms a part; and that the member extends substantially more than halfway across the groove when the neighboring tread is out of contact with the road.

Figure 5 shows the tread of the tire 1 as it appears when under a load and in contact with the road 5. It is seen that under these conditions the grooves 3 tend to close, with the result that the stone ejecting members 4 approach much nearer to or actually in contact with the opposite sidewalls of the grooves 3. When a stone or other hard object 6 comes within the tread peripheral edges of a groove 3, it is evident that it cannot be forced around the member 4 and into the bottom of the groove while the tread is in contact with the road, because the member 4 completely shuts off this path. Also, from a consideration of Figures 2, 3, and 4, it is clear that even when the tread is out of contact with the road and the groove 3 is in an expanded condition the member 4 springingly resists the passage of the object 6 around it towards the bottom of the groove. Furthermore, at the moment when the tread breaks contact with the road the simultaneous springing outward of the member 4 and the expansion of the groove 3 cooperate to eject any objects which have been picked up within the tread peripheral edges of the groove.

It is clear from Figure 5 that any stone 6 which may be picked up by the groove 3 and pressed against the projection 4 will encounter a resilient resistance which increases with the extent to which the stone is pressed against the projection. Moreover, the pressure of such a stone downwardly against the projection tends to force the same downwardly and outwardly towards the opposite groove sidewall and thereby seal the small passageway to the bottom of the groove. If the stone is pressed against the projection with sufficient force the projection is thereby pressed against the bottom of the groove 3 to completely fill the same, in which case it is impossible for the object to be forced under the projection, and when the tread breaks contact with the road the projection tends more strongly than ever to eject the object by a spring-like action.

It is to be noted that the traction elements 2 may take different forms from that of the ribs shown in Figure 1, and may, for example, consist of a series or a plurality of series of blocks extending circumferentially around the crown of the tire.

As an example of the effectiveness of tires embodying the invention, tests were carried out in which tires were run on a gravel road for several miles over a definite route and at twenty-five miles per hour, and then the stones which were retained in the grooves of the tread were counted. Next, the tires were run on a smooth pavement for a distance of two miles at a speed of fifty-five miles per hour, and the remaining stones were again counted. The average number of stones picked up on the gravel road are listed in Table 1 below under the heading "Stones picked up," and the average number of stones remaining after the run on smooth pavement is listed under the heading "Stones retained." Tires embodying the invention were thus compared with similar tires varying in the means within the tread grooves for ejecting stones, all means being some kind of projection from the sidewalls of the grooves and extending continuously circumferentially of the tire. The average results of these tests are shown in Table 1.

*Table 1*

| Type of stone ejector | Stones picked up | Stones retained |
|---|---|---|
| Single projection nearer tread periphery than bottom of groove and with axis at right angle to sidewall of groove | 81 | 48 |
| Single projection nearer bottom of groove than tread periphery and with axis at right angle to sidewall of groove | 13 | 2 |
| Double projections according to preferred construction of Patent No. 2,121,871 | 13 | 5 |
| Present invention | 4 | 0 |

As another example of the improvement of tires embodying the invention over tires embodying former stone ejecting means, a test was conducted to determine the extent to which stones picked up by the tires work around the stone ejectors and become wedged in the bottom of the grooves. The tires were run at twenty-five miles per hour over a twenty-four mile course of a road covered with natural and crushed stone and a few cinders. At the end of this run the total number of stones picked up were counted and also the number of stones in the bottom of the grooves under ejectors. The average results of this test are given in Table 2.

*Table 2*

| Type of stone ejector | Stones picked up | Stones under ejector |
|---|---|---|
| Double projections according to preferred construction of Patent No. 2,121,871 | 60 | 47 |
| Present invention | 16 | 0 |

Thus it is demonstrated by the above tests that tires embodying the present invention possess a relatively much lower tendency to pick up stones and show no tendency to retain the few which may be picked up, in great contrast with tires embodying the formerly more successful types of stone ejectors. Moreover, the test results given in Table 2 show very definitely that the present stone ejector construction entirely prevents such stones as are picked up by the tire embodying the ejector from working underneath the ejector and thereby damaging the bottom of the tread groove.

The present construction entirely satisfies the objects of the invention by greatly reducing stone pick-up and retention by the grooves of a tire tread; by completely preventing such stones as are picked up by the tread grooves from working past the stone ejectors and becoming wedged in the bottom of the grooves; and by accomplishing these desired results without in any way detracting from the non-skid efficiency or the appearance of the tire tread.

While only a single preferred embodiment of the invention has been shown, it will be understood that various modifications may be made therein without departing from the spirit of the invention and the scope of the appended claims.

What is claimed is:

1. A tire having a tread comprising a plurality of circumferentially extending traction elements defining grooves, and a continuous projection extending laterally from a sidewall of each groove, said projection being spaced from the tread periphery and the bottom of the groove, the axis of said projection intersecting the said groove sidewall along a line nearer to the bottom of the groove than to the tread periphery, said projection being tilted outwardly from the groove sidewall towards the tread periphery so that the axis of the projection makes an angle of about 60° with the groove sidewall to which the projection is attached, said projection extending substantially more than halfway across the groove when the neighboring tread is out of contact with the road, said projection having a convex surface on the side nearer to the tread periphery.

2. A tire having a tread comprising circumferentially extending traction elements defining a groove, and a substantially continuous projection extending laterally from a sidewall of the groove, said projection being spaced from the tread periphery and the bottom of the groove, the axis of said projection intersecting the said groove sidewall along a line nearer to the bottom of the groove than to the tread periphery, said projection being tilted outwardly from the groove sidewall towards the tread periphery so that the axis of the projection makes an acute angle with the groove sidewall to which the projection is attached, said projection extending substantially more than half way across the groove when the neighboring tread is out of contact with the road.

3. A tire having a tread comprising circumferentially extending traction elements defining a groove, and a substantially continuous projection extending laterally from a sidewall of the groove, said projection being spaced from the tread periphery and the bottom of the groove, the axis of said projection intersecting the said groove sidewall along a line nearer to the bottom of the groove than to the tread periphery, said projection being tilted outwardly from the groove sidewall towards the tread periphery so that the axis of the projection makes an acute angle with the groove sidewall to which the projection is attached, said projection having a convex surface extending radially outwardly from the groove sidewall to which the projection is attached and on the side of the projection nearer to the tread periphery.

4. A tire having a tread comprising circumferentially extending traction elements defining a groove, and a substantially continuous projection extending laterally from a sidewall of the groove, said projection being spaced from the tread periphery and the bottom of the groove, the axis of said projection intersecting the groove sidewall on a line spaced nearer to the bottom of the groove than to the tread periphery, said projection being tilted outwardly from the groove sidewall toward the tread periphery so that the said axis makes an acute angle with the sidewall, the width of the projection, as measured along the axis thereof from the said sidewall, being substantially equal to the width of the groove at the base thereof.

E. WALDO STEIN.